United States Patent Office 3,280,197
Patented Oct. 18, 1966

3,280,197
PROCESS FOR PREPARING HALOPHENOXY-
METHYL HALIDES
Sherman C. Lashua, Midland, and Dan E. Ranck, Sanford, Mich., assignors to The Dow Chemical Company, Midland, Mich., a corporation of Delaware
No Drawing. Filed Mar. 5, 1962, Ser. No. 177,242
3 Claims. (Cl. 260—612)

This invention relates to halophenoxymethyl halides and to a process for producing the same. More particularly it relates to a process for the preparation of halophenoxymethyl halides which conform to the general formula:

R·O·CH$_2$Cl wherein R denotes a benzene nucleus having two or more halogen substituents.

Various attempts have been made in the past to prepare monochloro compounds of the type R·O·CH$_2$Cl. The state of the prior art is exemplified in the following reference sources.

U.S. 2,668,860, issued February 9, 1954, claims a general method of preparing both unsubstituted and substituted phenoxymethyl chlorides wherein the sulphonic acids, C$_6$H$_5$·O·CH$_2$SO$_3$H or their salts are reacted with phosphorus oxychloride, phosphorus pentachloride or thionyl chloride.

The direct replacement by chlorine of the hydrogen atoms of the methyl group in methylphenyl ethers appears to have been investigated by Hugouneng (Ann. Chem. (6) 20, 1890, 551) and Weygand (J. Prakt. Chem. 155, 1940, 342–346), in the single case of anisole in an attempt to prepare anisyl chloride. Complex mixtures of chlorination products were obtained in which nuclear chlorination products were found to be present as by-products but which were not separated or individually identified.

U.S. 2,733,271, issued January 31, 1956, describes a process for the chlorination of a chlorophenoxy methane which comprises subjecting a chloropentoxy methane in which at most two of the hydrogen atoms of the methane residue are substituted by chlorine atoms, in the liquid phase, to the action of chlorine at a temperature of 160° C. to 260° C., preferably in the presence of a catalyst such as phosphorus trichloride or phosphorous pentachloride, until the desired quantity of chlorine has been absorbed.

It is a primary object of the present invention to provide a process for the preparation of halophenoxymethyl halides of the type described herein which is simple to carry out, economical, and results in improved yields of products of a high degree of purity.

Other and related objects will become evident from the following specification and claims.

In accordance with the present invention it has been unexpectedly found that halophenoxymethyl halides of the general formula R·O·CH$_2$Cl wherein R in the above formula denotes a benzene nucleus having two or more halogen substituents, can conveniently be prepared in good yields and in a high state of purity by heating a halophenoxyacetyl chloride of the general formula R·O·CH$_2$COCl at temperatures sufficient to effect pyrolysis of said halophenoxyacetyl chloride.

The halophenoxyacetyl chlorides employed in the present invention may be produced from the corresponding halophenoxyacetic acids in known manner.

Suitable halophenoxyacetic acids are well known in the art, or if desired may be prepared in accordance with known methods wherein for example, an alkali metal salt of a halophenol is reacted with an alpha halo acetic acid.

A preferred method of producing halophenoxy acetyl chlorides useful for the purposes of the present invention comprises reaction of a halophenoxyacetic acid with a molecular excess of thionyl chloride. In the reaction, the reaction mixture is generally heated at temperatures sufficient to reflux said thionyl chloride for periods between about 0.5 to 2 hours to form the desired halophenoxyacetyl chloride. Excess thionyl chloride is subsequently removed by heating the crude reaction product under reduced pressures (between about 40 mm. and 50 mm. of mercury).

The crude halophenoxyacetyl chloride may be purified by distillation in vacuo (preferably pressures of less than about 5 mm. of mercury). However, such purification is generally unnecessary for the purposes of the present invention.

In the practice of the present invention, it is critical and essential that the phenoxyacetyl chloride have at least two nuclear substituted halogen atoms.

Specific halophenoxyacetyl chlorides suitable for the purpose of the present invention include, but are not restricted to: 2,4-dichlorophenoxyacetyl chloride, 2,5-dichlorophenoxyacetyl chloride, 2,4,5-trichlorophenoxyacetyl chloride, 2,4,6-trichlorophenoxyacetyl chloride, pentachlorophenoxyacetyl chloride, 2,4-dibromophenoxyacetyl chloride, 2,5,-dibromophenoxacetyl chloride, 2,4,6-tribromophenoxyacetyl chloride, pentabromophenoxyacetyl chloride, and polyhalophenoxyacetyl chlorides having mixed nuclear halogen substitution.

The temperature for the conversion of the halophenoxyacetyl chloride suitable for the purposes of the present invention while not critical is important and materially improved results are obtained when temperatures sufficient for refluxing said halophenoxyacetyl chlorides are employed. Reaction temperatures below that required to reflux said halophenoxyacetyl chlorides lead to incomplete conversion to the desired halophenoxymethyl halide.

It has been found when the halophenoxyacetyl chlorides are refluxed at atmospheric pressure, the reaction is substantially complete within a period of between about 0.5 and 3 hours. The reaction time is generally contingent upon the halophenoxyacetyl chloride used and/or on the reaction temperature employed. In general, reaction times between about 0.5 and 3 hours, and preferably between 1 and 2 hours have been found to be most satisfactory for the purposes of the present invention.

Normally, it is preferred to heat the reaction mixture in an open system at atmospheric pressure conditions. However, the reaction mixture can be suitably heated in a closed system where pressures between about atmospheric and 28 or more atmospheres can be suitably employed. In general, the use of higher pressure is less desirable since it requires special complex and expensive high pressure equipment in which to conduct the reaction.

Upon completion of the reaction the halophenoxy methyl halides can be obtained in substantially pure condition and in excellent yields by distillation from the reaction medium. The temperature of distillation is kept as low as possible by distilling in vacuo, preferably using pressures less than about 1 mm. of mercury.

The halophenoxymethyl halides of the present invention have application as intermediates in organic synthesis, being particularly useful for the preparation of compounds which contain a methylene group linked by oxygen to a substituted or unsubstituted aromatic nucleus.

The following examples, wherein all parts and percentages are to be taken by weight, illustrate the present invention but are not to be construed as limiting its scope.

Example 1

A mixture of 342 grams thionyl chloride and 221 grams 2,4-dichlorophenoxyacetic acid was heated at reflux for a period sufficient to form the corresponding 2,4-dichlorophenoxyacetyl chloride. Excess thionyl chloride was removed by heating the crude reaction product at temperatures between about 85° C. and 100° C. under pressures of about 40 mm. and 50 mm. of mercury.

The thionyl chloride free, crude reaction product was heated at reflux under atmospheric pressure for a period of two hours, and distilled, giving 121 grams 2,4-dichlorophenoxymethyl chloride, B.P. 100–110° C. at 0.3 mm., M.P. about 56° C.

Example 2

A mixture of 340 grams thionyl chloride and 255.5 grams 2,4,5-trichlorophenoxyacetic acid was heated at reflux for a period sufficient to form the corresponding 2,4,5-trichlorophenoxyacetyl chloride, and the product worked up as in Example 1, giving 153 grams 2,4,5-trichlorophenoxymethyl chloride, B.P. 175° C.–185° C. at 0.5 mm., M.P. about 84.7° C.

What is claimed is:

1. A process for preparing halophenoxymethyl halides of the formula $$R \cdot O \cdot CH_2Cl$$

wherein R in the above formula denotes a benzene nucleus having two or more halogen substituents, which comprises heating a halophenoxyacetyl chloride of the formula $$R \cdot O \cdot CH_2COCl$$

wherein R denotes a benzene nucleus having at least two halogen substitutents said substituents being selected from the group consisting of chlorine and bromine, under atmospheric pressure at a temperature sufficient to reflux said halophenoxyacetyl chloride.

2. The process of claim 1, wherein the halophenoxyacetyl chloride is 2,4-dichlorophenoxyacetyl chloride and the resulting halophenoxymethyl halide is 2,4-dichlorophenoxymethyl chloride.

3. The process of claim 1, wherein the halophenoxyacetyl chloride is 2,4,5-trichlorophenoxyacetyl chloride and the resulting halophenoxymethyl halide is 2,4,5-trichlorophenoxymethyl chloride.

References Cited by the Examiner

Mailke: Compt. rend., vol. 180 (1925), pages 1111–1113.

LEON ZITVER, *Primary Examiner.*

B. HELFIN, *Assistant Examiner.*